(12) United States Patent
Vigliano et al.

(10) Patent No.: US 12,494,297 B2
(45) Date of Patent: Dec. 9, 2025

(54) SYSTEMS FOR UNDERWATER TOOL POSITIONING

(71) Applicant: GE-HITACHI NUCLEAR ENERGY AMERICAS LLC, Wilmington, NC (US)

(72) Inventors: Vincent C. Vigliano, Wilmington, NC (US); Colin F. Kelemen, Wilmington, NC (US); Tyler B. Hull, Wilmington, NC (US); Brandon Novak, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 769 days.

(21) Appl. No.: 16/809,539

(22) Filed: Mar. 4, 2020

(65) Prior Publication Data

US 2020/0286637 A1 Sep. 10, 2020

Related U.S. Application Data

(60) Provisional application No. 62/813,241, filed on Mar. 4, 2019.

(51) Int. Cl.
*G21C 19/20* (2006.01)
*B25J 11/00* (2006.01)
(Continued)

(52) U.S. Cl.
CPC ............... *G21C 19/20* (2013.01); *B25J 11/00* (2013.01); *B25J 19/00* (2013.01); *G21C 17/003* (2013.01); *G21C 19/207* (2013.01)

(58) Field of Classification Search
CPC ............ B25J 11/00; B25J 19/00; G21C 19/20
(Continued)

(56) References Cited

U.S. PATENT DOCUMENTS 3,666,120 A * 5/1972 Paine .................... B66C 23/703
414/565
4,169,758 A 10/1979 Blackstone et al.
(Continued)

FOREIGN PATENT DOCUMENTS

JP 7-110320 4/1995
JP 9-159788 6/1997
(Continued)

OTHER PUBLICATIONS

Areva, "Remote Mechanized Steam Dryer OD/ID Inspection Systems," Jul. 2013.
(Continued)

*Primary Examiner* — Jack W Keith
*Assistant Examiner* — Daniel Wasil
(74) *Attorney, Agent, or Firm* — Alley IP

(57) ABSTRACT

Systems and methods position tools about a flooded nuclear reactor during maintenance outages without support structures connected above the systems or reactor. Systems may include annular clamps for support from a reactor steam dam, a telescoping mast, a motor or other drive to extend or retract the mast, and/or an articulator to hold the payload and move the same about any degree of freedom. The telescoping mast may include several nested sections joined to a drive motor. Several different articulators are useable, including those with separate gearings for rotation about perpendicular axes and self-leveling wrists to orient tools in verifiable positions. Systems can be locally or remotely powered and controlled through powered and communicative connections to move about any position in a reactor annulus or core.

19 Claims, 9 Drawing Sheets

(51) Int. Cl.
  *B25J 19/00* (2006.01)
  *G21C 17/003* (2006.01)
(58) Field of Classification Search
  USPC .................................................. 376/260, 271
  See application file for complete search history.

(56) References Cited

U.S. PATENT DOCUMENTS

| | | | | |
|---|---|---|---|---|
| 4,427,623 | A * | 1/1984 | Howard | G21C 19/02 |
| | | | | 376/271 |
| 4,585,610 | A | 4/1986 | Andersson et al. | |
| 5,084,231 | A * | 1/1992 | Dixon | G21C 19/16 |
| | | | | 376/271 |
| 5,315,795 | A * | 5/1994 | Chae | B66F 11/00 |
| | | | | 52/111 |
| 5,687,207 | A * | 11/1997 | Meuschke | G21C 19/205 |
| | | | | 376/271 |
| 5,737,377 | A | 4/1998 | Stefko et al. | |
| 9,318,226 | B2 | 4/2016 | Foley et al. | |
| 10,074,448 | B2 | 9/2018 | Foley et al. | |
| 2005/0056105 | A1 * | 3/2005 | Delacroix | G21C 17/017 |
| | | | | 376/249 |
| 2005/0135904 | A1 * | 6/2005 | Wivagg | G21C 17/003 |
| | | | | 414/222.01 |
| 2007/0146480 | A1 | 6/2007 | Judge et al. | |
| 2007/0263760 | A1 | 11/2007 | Taillandier | |
| 2013/0033594 | A1 | 2/2013 | Smith et al. | |
| 2013/0270241 | A1 | 10/2013 | Taillandier | |
| 2013/0329848 | A1 | 12/2013 | Linnebur | |
| 2014/0270038 | A1 | 9/2014 | Delaune et al. | |
| 2016/0336084 | A1 * | 11/2016 | LaGuardia | B23K 9/23 |
| 2017/0140844 | A1 | 5/2017 | Kelemen | |
| 2018/0053572 | A1 | 2/2018 | Vigliano et al. | |
| 2020/0126681 | A1 | 4/2020 | Mann | |

FOREIGN PATENT DOCUMENTS

| | | |
|---|---|---|
| JP | 10-186081 | 7/1998 |
| JP | 2008-521608 | 6/2008 |
| JP | 2018054600 | 4/2018 |
| JP | 2018-522252 | 8/2018 |
| WO | 2016183388 | 11/2016 |

OTHER PUBLICATIONS

Areva, "HawkEye Remote Mechanized In-Vessel Visual Inspection System for BWRs," 2016.
Areva, "In Vessel Visual Inspection (IVVI)," Jul. 2013.
WIPO, International Search Report in corresponding PCT Application PCT/US2020/021043, Jun. 19, 2020.
WIPO, Written Opinion in corresponding PCT Application PCT/US2020/021043, Jun. 19, 2020.
JPO, Reasons for Refusal in corresponding JP application 2021-552186, Dec. 18, 2023.
EPO, Office Action in corresponding EP application 20767082.9, Sep. 20, 2024.
JPO, Office Action in corresponding JP application 2021-552186, Aug. 20, 2024.
CIPO, Office Action in corresponding CA application 3,131,893, Mar. 18, 2025.

* cited by examiner

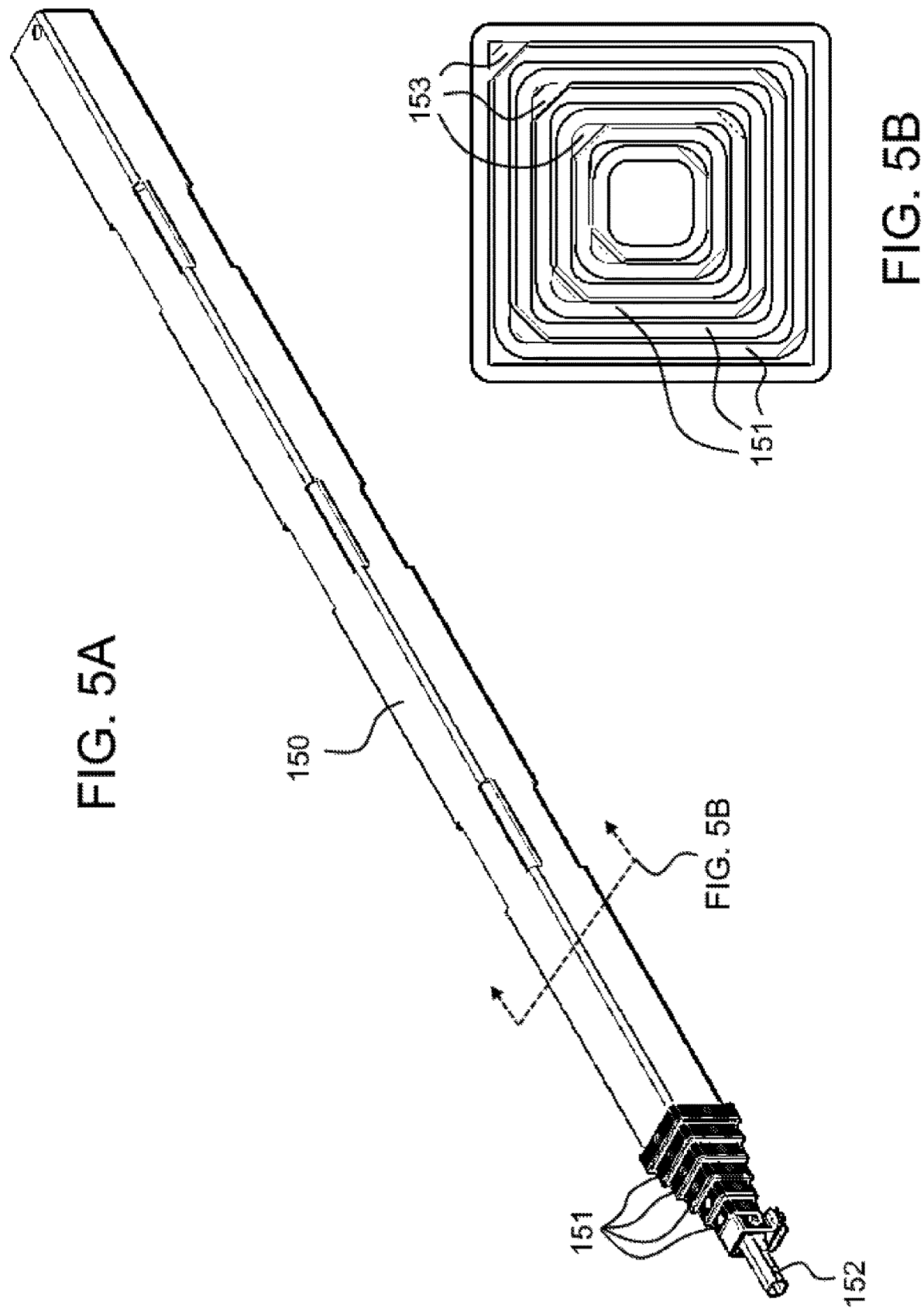

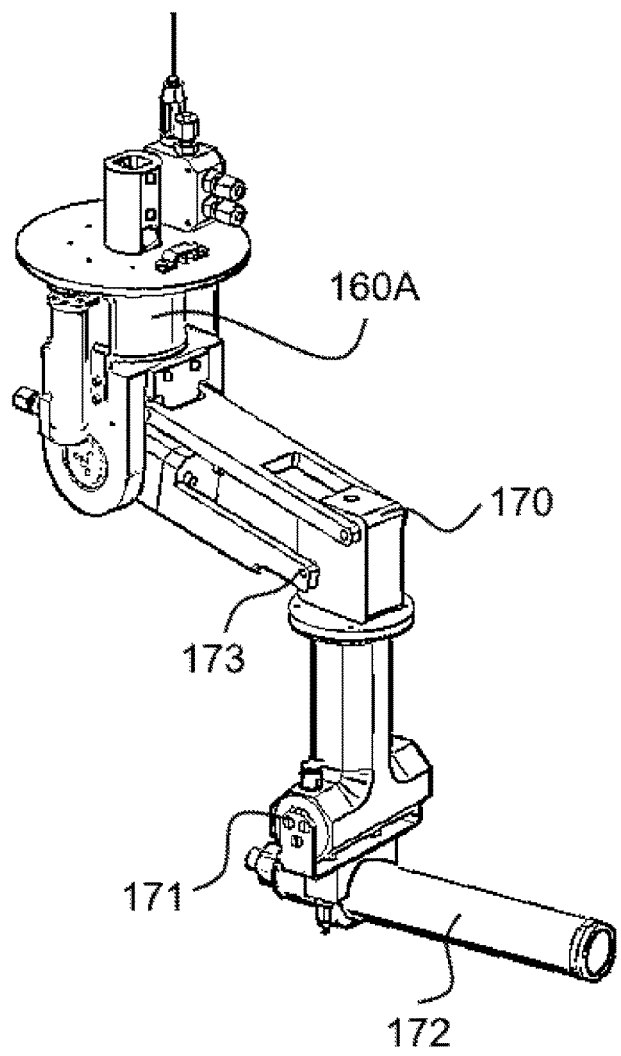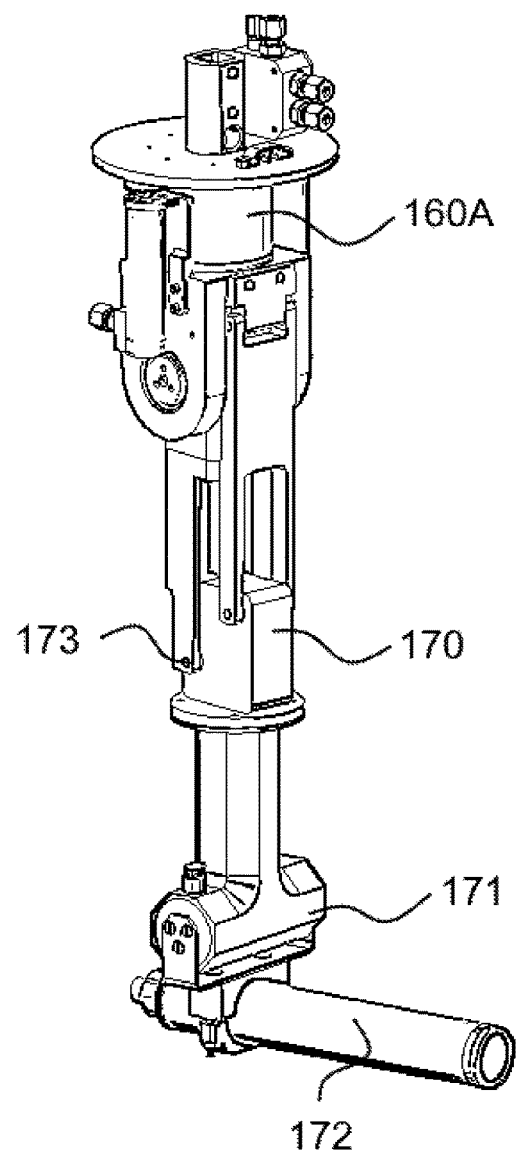
FIG. 9A
FIG. 9B

SYSTEMS FOR UNDERWATER TOOL POSITIONING

RELATED APPLICATIONS

This application claims priority under 35 U.S.C. § 119 to co-pending U.S. Provisional Application 62/813,241, filed Mar. 4, 2019 and incorporated by reference herein in its entirety.

BACKGROUND

FIG. 1 is selective view of a related art nuclear core shroud 10, useable in a nuclear reactor like a BWR. Core shroud 10 may be positioned in annulus region 20, which is an annular space formed between shroud 10 and an inner wall of a reactor pressure vessel (not shown) that receives fluid coolant flow and directs it downward for entry at a bottom of core 30. Shroud 10 may be a cylindrical structure surrounding core 30 that partitions the reactor into these downward and upward coolant flows on opposite radial sides of shroud 10. One or more jet pump assemblies 40 may line annulus 20 and direct coolant flow in this manner.

After being directed downward past core shroud 10, coolant may then flow up through core 30 inside shroud 10. Core 30 is typically populated by several fuel assemblies (not shown) generating heat through nuclear fission during operation, and the coolant exiting core 30 may be quite energetic and potentially boiling. This energetic fluid flows up through and out of core 30 and shroud 10, potentially into steam separating and drying structures and ultimately to a turbine that drives a generator to convert the energetic flow into electricity. The top portion 15 of shroud 10 may terminate below such drying structures, and various core equipment may rest on or join to shroud 10 about top portion 15, which may be called a steam dam. One or more gussets 16 may be aligned about top portion 15 of shroud 10 to support or join a shroud head (not shown), chimney, or drying structures.

During a reactor outage, such as a refueling outage or other maintenance period, the reactor vessel may be opened and inspected, and internal structures of vessel may be removed. During an outage, loading equipment such as a bridge and trolley above the reactor, and 40-50 feet above core 30 and shroud 10, may move and load new fuel assemblies in core 30. Visual inspections of shroud 10, core 30, and/or any other component can be accomplished with video or camera equipment operated from the bridge or other loading equipment above the reactor during this time. For example, the positioning and inspection devices of co-owned US Pat Pub 2017/0140844 to Kelemen, published May 18, 2017, incorporated herein by reference in its entirety, may be used in connection with inspections from steam dam 15.

SUMMARY

Example methods and embodiment assemblies can position an instrument or tool about a nuclear reactor while completely submerged and without any support or alignment structure, such as a crane, track, motor, bridge, etc. vertically above the assembly where refueling equipment may be working. Example embodiments may include an annular clamp for support from a top of the reactor, an extendible shaft, a motor or other drive to extend or retract the shaft, and/or an articulator secured to an end of the shaft to hold the implement and move the same about any degree of freedom. For example, the extendible shaft may be a telescoping mast joined to a drive motor. Several different articulators are useable in example assemblies, including those with separate gearings for rotation about perpendicular axes and self-leveling wrists to orient tools in confirmed positions. Example embodiments can be locally or remotely powered and controlled through powered and communicative connections.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

Figure 4C:
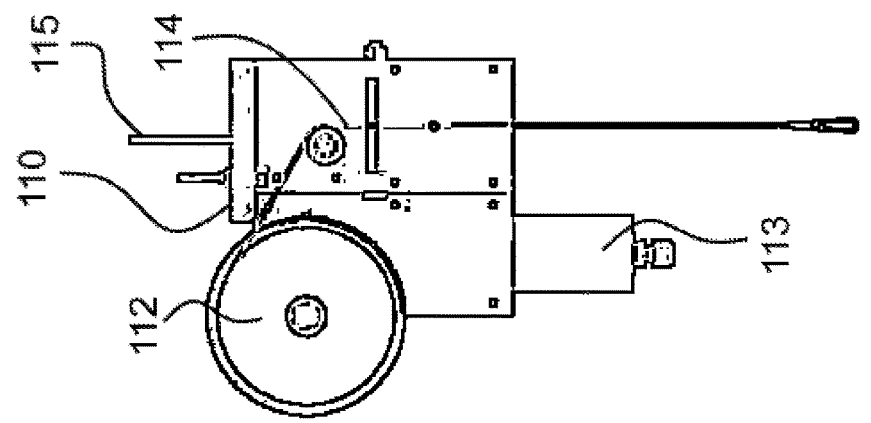
Figure 4B:
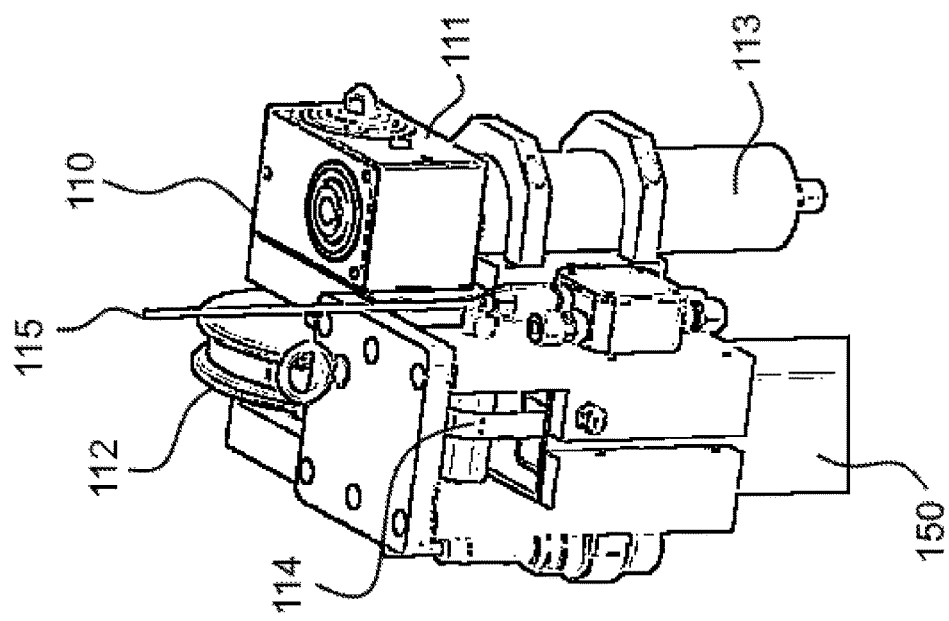
Figure 4A:
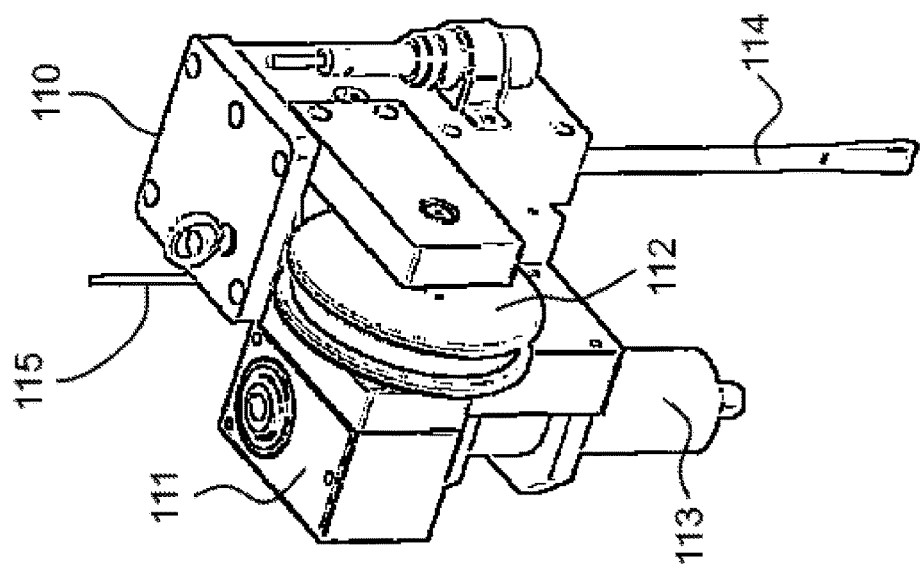

FIG. 4A is an illustration of an example embodiment drive from a front. FIG. 4B is an illustration of the example embodiment drive from a back. FIG. 4C is an illustration of the example embodiment drive from a side.

FIG. 5A is an illustration of an example embodiment mast. FIG. 5B is an illustration of a cross-section of the example embodiment mast.

Figure 6A:
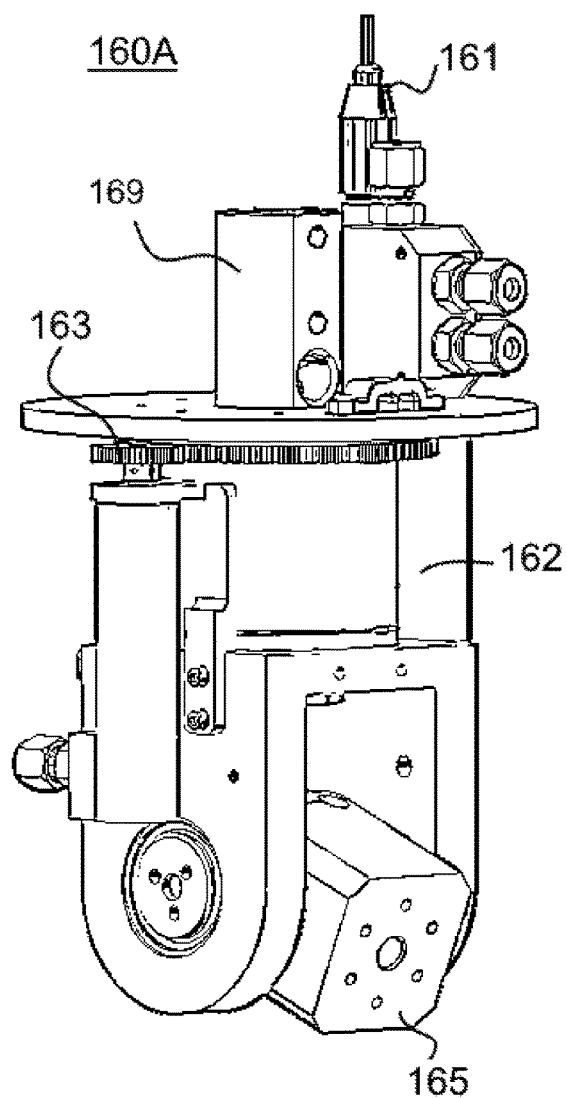
Figure 6B:
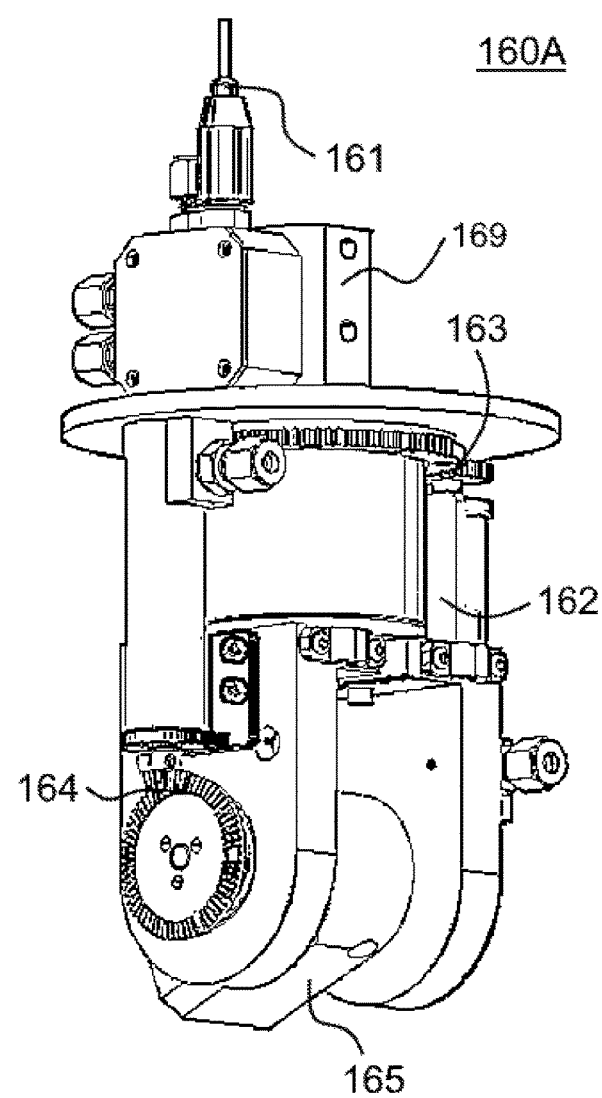

FIG. 6A is an illustration of an example embodiment articulator in a first configuration. FIG. 6B is an illustration of the example embodiment articulator in a second configuration.

Figure 7B:
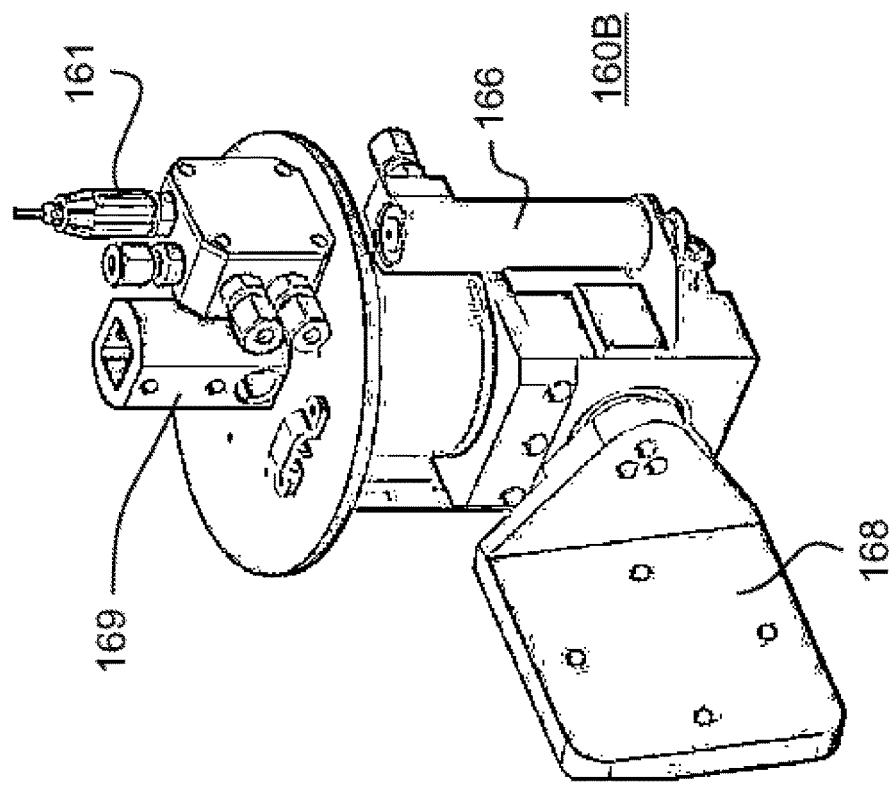
Figure 7A:
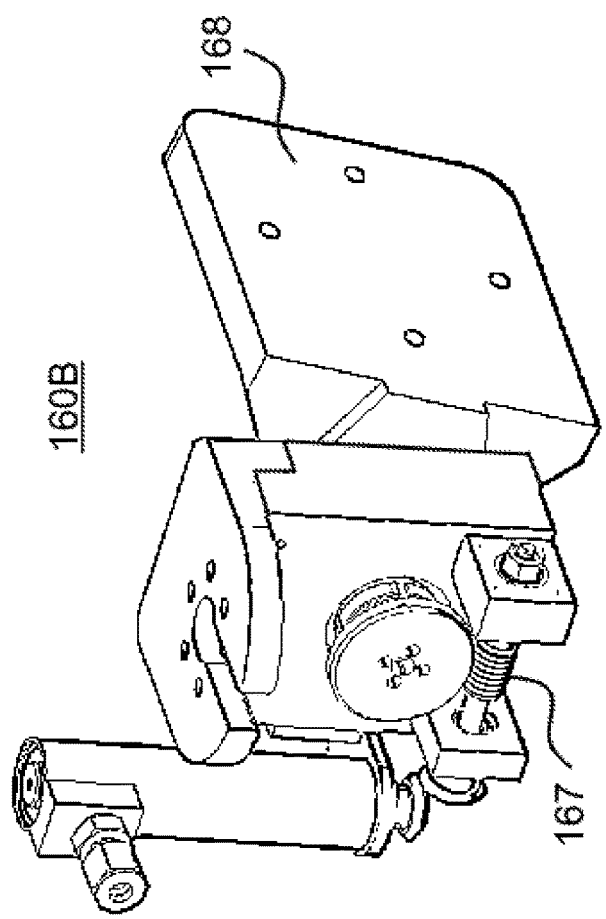

FIG. 7A is an illustration of another example embodiment articulator showing a bottom portion. FIG. 7B is an illustration of the example embodiment articulator.

Figure 8:
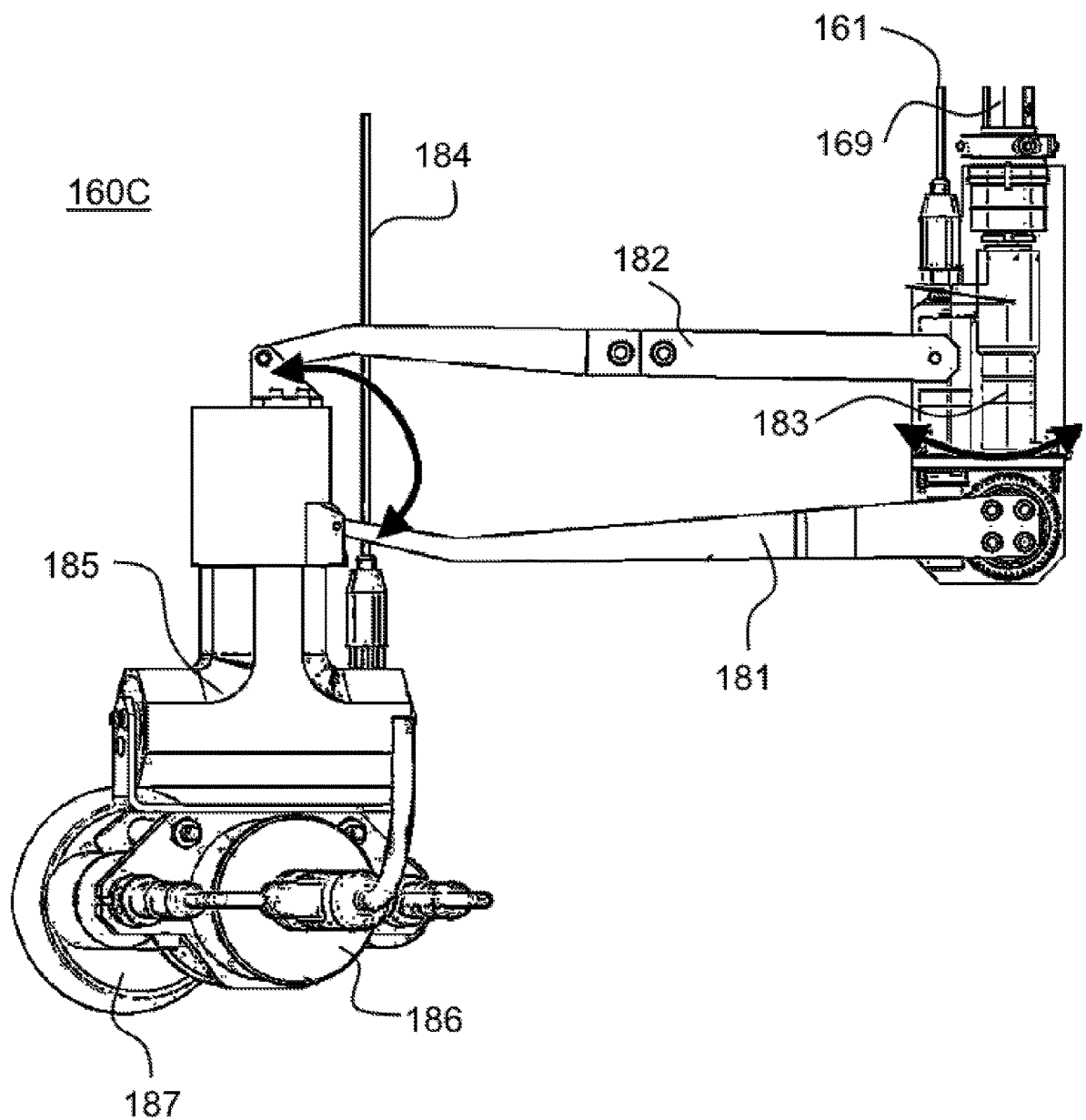

FIG. 8 is an illustration of another example embodiment articulator.

FIG. 9A is an illustration of an example embodiment wrist in a first configuration. FIG. 9B is an illustration of the example embodiment wrist in a second configuration.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Modifiers "first," "second," "another," etc. may be used herein to describe various items, but they do not confine modified items to any order. These terms are used only to distinguish one element from another; where there are "second" or higher ordinals, there merely must be that many number of elements, without necessarily any difference or other relationship. For example, a first element could be termed a second element, and, similarly, a second element could be termed a first element unless an order or difference is separately stated. In listing items, the conjunction "and/ or" includes all combinations of one or more of the associated listed items. The use of "etc." is defined as "et cetera" and indicates the inclusion of all other elements belonging to the same group of the preceding items, in any "and/or" combination(s).

When an element is related, such as by being "connected," "coupled," "mated," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two devices, including intermediary devices, networks, etc., connected wirelessly or not.

As used herein, "axial" and "vertical" directions are the same up or down directions oriented along the major axis of a nuclear reactor, often in a direction oriented with gravity. "Transverse" directions are perpendicular to the "axial" and are side-to-side directions at a particular axial height, while "radial" or "circumferential" directions are also perpendicular to the "axial" in an angular direction, such as about a perimeter of a cylindrical nuclear reactor pressure vessel.

As used herein, singular forms like "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Possessive terms like "comprises," "includes," "has," or "with" when used herein, specify the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that inspections and maintenance operations in a nuclear reactor core consume valuable above-core, and often above-water, space to support and align systems that connect to the actual tools below. This space above the reactor may be shared with a refueling bridge or trolley as well as cranes for core fuel moves and other maintenance during an outage. As such, the inventors have newly recognized a need for tooling that can be operated and supported outside this above-reactor space that is needed for other refueling and maintenance activities, while still allowing alignment and positioning verification, movement across a reactor inner and outer diameter, and support and powering not from this above reactor space. The inventors have developed example embodiments and methods described below to address these and other problems recognized by the Inventors with unique solutions enabled by example embodiments.

The present invention is systems and methods for no-overhead reactor maintenance and inspection. In contrast to the present invention, the few example embodiments and example methods discussed below illustrate just a subset of the variety of different configurations that can be used as and/or in connection with the present invention.

Figure 2:
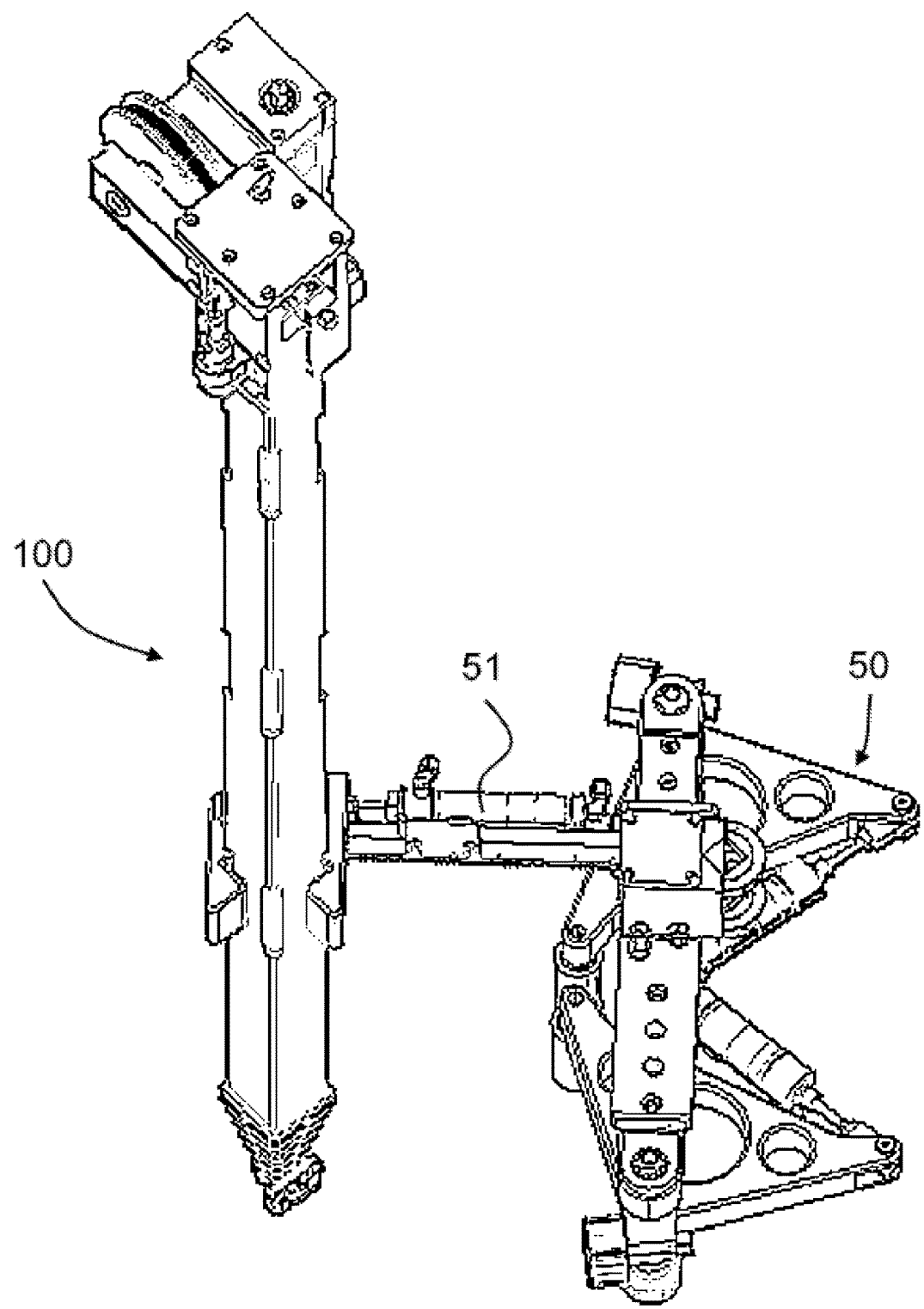
FIG. 2 is an illustration of an example embodiment clamp system.

FIG. 2 is an illustration of an example embodiment system 100 configured to inspect or operate on structures about a nuclear reactor vessel. As shown in FIG. 2, example embodiment system 100 is useable with a positioning device such as steam dam clamp 50 from the incorporated '844 publication as well as U.S. patent application Ser. No. 16/166,881, by Jason D. Mann, filed Oct. 22, 2018 for POSITIONING AND INSPECTION APPARATUSES FOR USE IN NUCLEAR REACTORS, incorporated herein by reference in its entirety. For example, system 100 may be grasped in arm 51 of clamp 50 moving along a nuclear reactor steam dam or other submerged structure. No other support or alignment device may extend upward from system 100, such that system 100 may be operated entirely from clamp 50 or another submerged vantage without any overhead counterweight or alignment track that may crowd above-core refueling space and operations.

Figure 1:
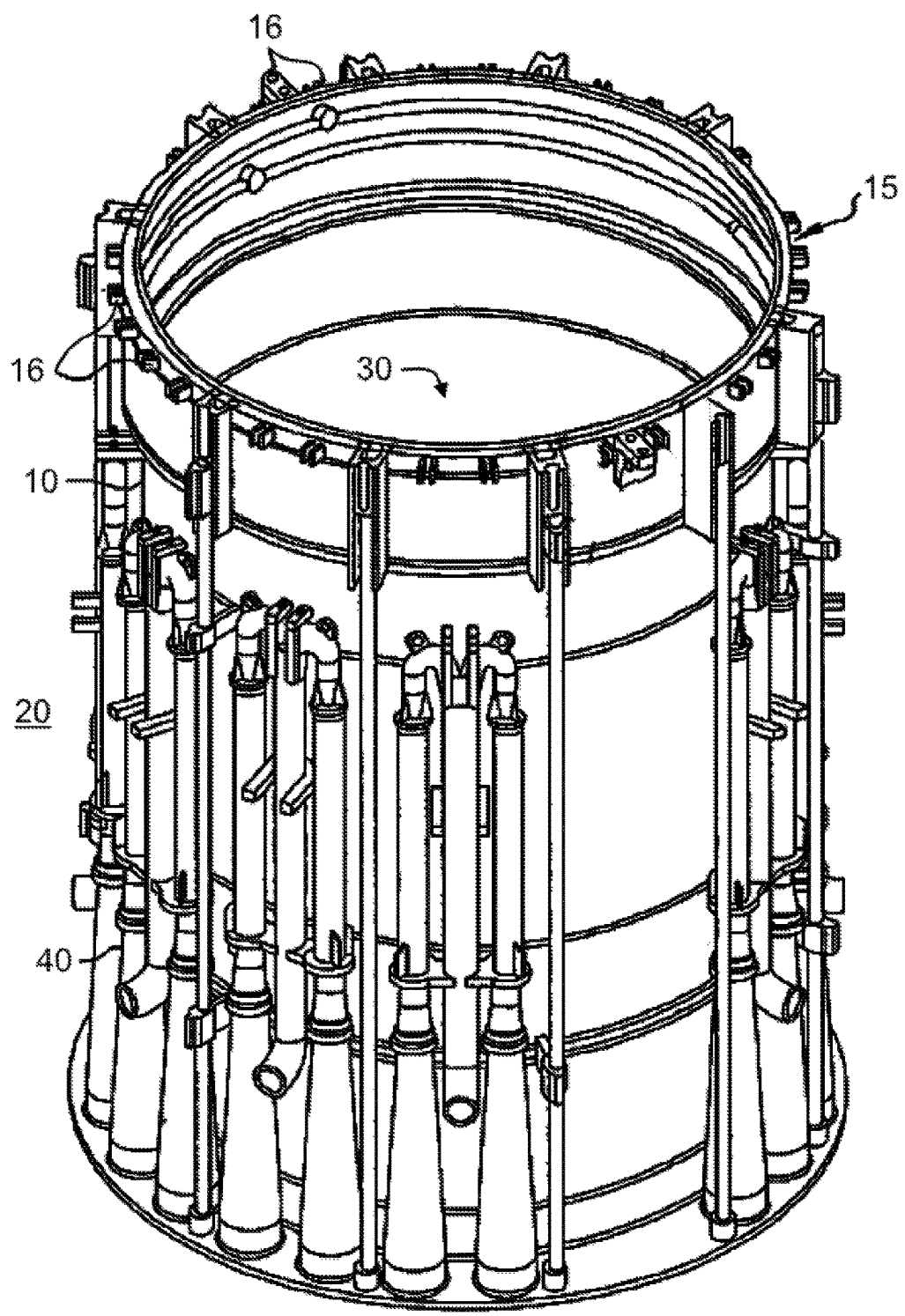
FIG. 1 is an illustration of a related art nuclear power vessel core shroud.
Figure 3A:
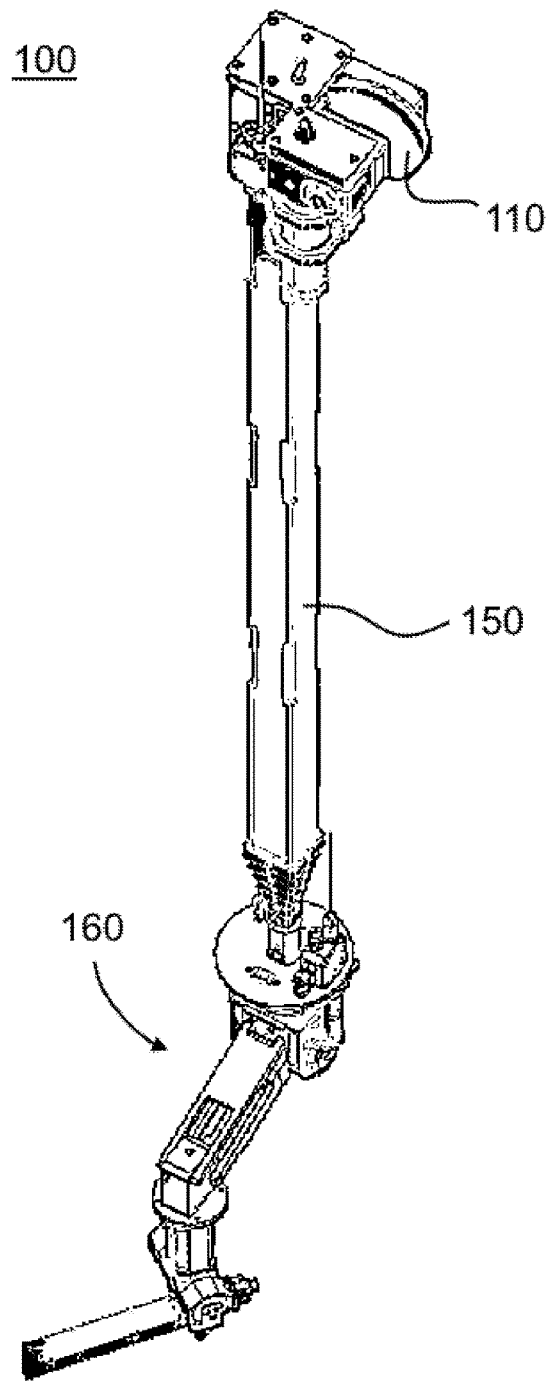
FIG. 3A is an illustration of an example embodiment positioning system from a top perspective.
Figure 3B:
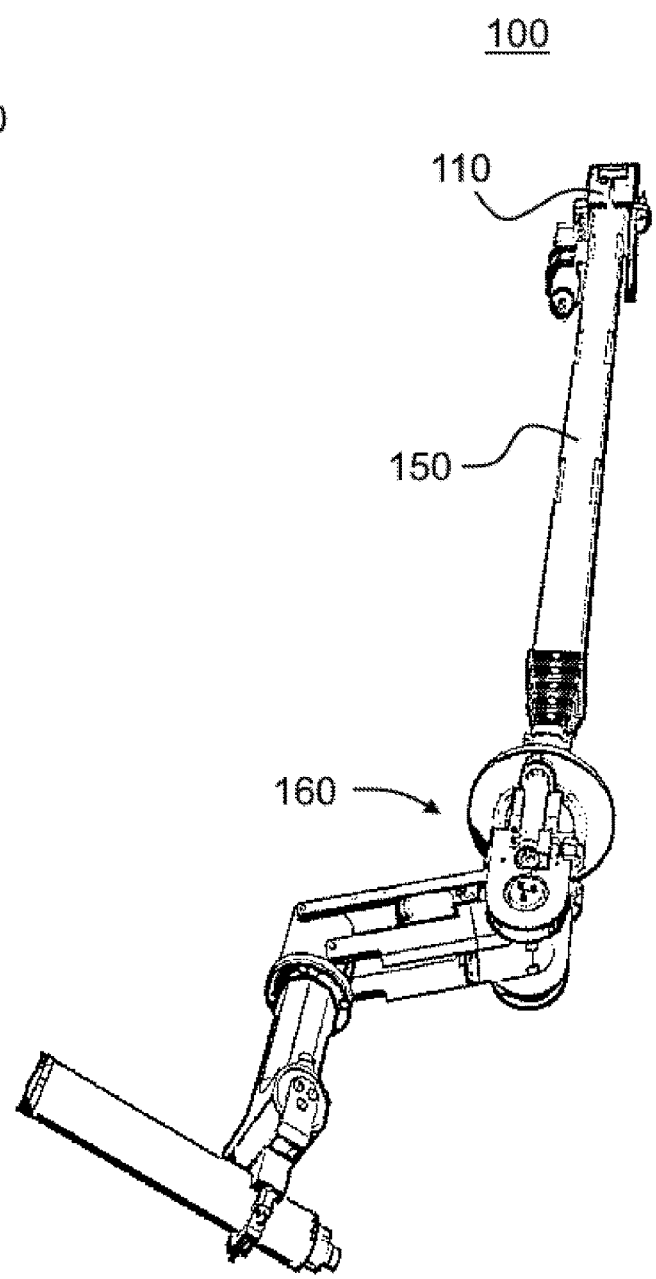
FIG. 3B is an illustration of the example embodiment positioning system from a bottom perspective.

FIGS. 3A and 3B show example embodiment system 100 in isolation, with top drive 110 at a vertical top of mast 150 and articulator assembly 160 at vertical bottom of mast 160. Example embodiment system 100 is sized to fit both in an annulus as shown in FIG. 1 between a core shroud and reactor vessel as well as on an inner side of a shroud. While oriented with a longest dimension in the vertical in FIGS. 3A and 3B, it is understood that example embodiment system 100 may be angled or used in any other orientation. While communications, control, and or electrical power lines may extend vertically down to system 100, other support or alignment structures are optional, because example embodiment system 100 is useable fully submerged and with self-powering and support from a clamp or other structure.

FIGS. 4A-C are front, rear, and profile schematics of top drive 110 useable in example embodiment system 100. As shown in FIG. 4A, tape or cable 114 may extend downward to vertically extend or retract mast 150 shown in FIG. 4B. Top drive 110 includes motor 111 connected to cable 114, potentially through spool 112, to extend and retract cable 114 by rotating spool 112. Communications and/or power cable 115 may extend up to a power source or controller interface; however, top drive 110 may have local power and be operable wirelessly through wireless control signals, such as radio, Wi-Fi, etc. Camera 113 may similarly be operated and powered through power cable 115 and/or powered and operated wirelessly. As shown in FIG. 4C, camera 113 may be oriented directly with cable 114 and mast 150 (FIG. 4B) to verify exact extension status and transverse or radial alignment of system 100. Although top drive 110 is shown at a highest vertical position of mast 150 in FIG. 4B and elsewhere, it is understood that top drive may be positioned anywhere else, including at a bottom or separately, to provide power to extend and retract mast 150.

FIGS. 5A and 5B are perspective and cross-sectional schematics of mast 150 useable in example embodiment system 100. As shown in FIG. 5A, mast 150 may be a telescopic tube with several sections 151 that are extendible and retractable. Mast 150 may have a generally rectangular or prismatic outer profile, potentially with several insets or notches, to securely seat into a positioning or support structure at a same axial level as a reactor, such as clamp 50 (FIG. 2). Several telescoping sections 151 may be nested within one another to extend and retract several multiples of a length of mast 150. For example, telescoping sections 151 may descend under force of gravity as cable 114 (FIG. 4B), attached to an inner-most mast, extends; reversal of cable 114 may then retract mast 150, section 151 by section 151. In this way, mast 150 may be positioned at any desired axial height underwater and/or adjacent to a reactor. As seen in the cross-section of FIG. 5B, one or more stops 153 may be at a bottom of each sections 151 to prevent overtravel of a next inner section 151. Connection adapter 152 may be joined to an inner-most section 151 as well as an articulator or tooling.

Although mast 150 is shown as the vertical-extending portion of example embodiment system in FIGS. 2, 3A, and 3B, it is understood that other extendible and retractable bodies may be used instead, such as a rope or tether, or extendible ribbons that become rigid when joined in multiple dimensions when unspooling in the direction of extension, etc. Several different potential articulators are useable with example embodiment systems, as described below. Although articulators are described as providing pan and tilt about vertical and transverse axes, it is understood that mast 150 itself may be rotatable about a vertical or other axis, providing desired positioning.

FIGS. 6A and 6B are perspective views of an example embodiment articulator 160A in different configurations useable in example embodiment system 100. As shown in FIGS. 3A, 3B, 6A, and 6B, articulator 160A may include a connection post 169 that joins to mast 150 (FIG. 5A), such as via connection adapter 152 (FIG. 5A). Articulator 160A may rotate about both a vertical axis and a transverse axis. For example, a rotatable outer frame 162 may join to a body with non-rotatable connection post 169 via planetary gear system 163. A motor in planetary gear system 163 and matching teethed track and gear may rotate outer frame 162 to any desired degree about a vertical axis, allowing 360-degree panning of tools and instruments attached to the same. And, for example, dial gear system 164 may rotate a tooling or center post 165 to any degree about a transverse axis. One or more motors in gear systems 164 and 163 may provide power to position central post 165 at any desired orientation, and control or power may be received through control connection 161 or a local power source with wireless connection may be used for power and control.

FIGS. 7A and 7B are perspective views of an example embodiment articulator 160B in different configurations useable in example embodiment system 100, with FIG. 7A showing only the lower portion of example articulator 160B. As shown in FIGS. 7A and 7B, articulator 160B may include a connection post 169 that joins to mast 150 (FIG. 5A), such as via connection adapter 152 (FIG. 5A). Articulator 160B may rotate about both a vertical axis and a transverse axis in a similar manner to example articulator 160A with motor 166 powering planetary and/or worm gear systems with control connection 161 or local and wireless control and power systems allowing control of the same. For example, worm gear system 167 may rotate a tooling or plate arm 168 to any degree about a transverse axis.

FIG. 8 is a profile views of another example embodiment articulator 160C useable in example embodiment system 100. As shown in FIG. 8, articulator 160C may include a connection post 169 that joins to mast 150 (FIG. 5A), such as via connection adapter 152 (FIG. 5A). Articulator 160B may rotate about both a vertical axis and a transverse axis.

For example, motor 183 may rotate articulator 160C on a vertical axis via a rotatable connection to connection post 160. Top arm 182 and bottom arm 181 may similarly be powered by motor 183 to rotate wrist 185 about a transverse axis, such as by upward or downward rotation of bottom arm 181 while top arm 182 remains static. Wrist 185 may itself move about another vertical axis or skew axis when who oriented by arms 181 and 182 via a planetary and/or worm gear system with control connection 161 or local and wireless control and power systems allowing control of the same. Rotatable mount 186 may further provide rotation about a transverse axis for tooling or central post 187.

FIGS. 9A and 9B are illustrations of a leveling wrist 170 in use with example embodiment articulator 160A in two different configurations. As shown in FIGS. 9A and 9B, articulator 160A may rotate a top portion of wrist 170 between horizontal and vertical positions, with a lower portion remaining vertical via two-point sliding joint 173. In this way, the lower portion of wrist 173 may always remain vertical based on the controlled displacement of two-point joint 173 with respect to rotation of articulator 160A. Additionally or alternatively, a float or level 172 may be paired with release 171 to permit self-leveling. For example, level 172 may always obtain a horizontal orientation when submerged, and release 171 may allow level 172 to achieve this orientation by selectively rotating with respect to the remainder of wrist 170.

Any tool or other device, including cameras, ultrasonic testers, welders, hydrolazers, jets, etc. may be attached to any articulator 160A-C and/or wrist 170 for desired powering and positioning without using space above the reactor for the same. Power and control signals may be provided through local batteries and/or motors as well as wireless connections, as well as the power and control wiring discussed above. Although power and control wiring my extend vertically above example embodiment system 100, these are not weight-bearing or aligning and thus require minimal space above the reactor.

Example embodiment system 100 may be fabricated of resilient materials that are compatible with a nuclear reactor environment without substantially changing in physical properties, such as becoming substantially radioactive, melting, brittling, or retaining/adsorbing radioactive particulates. For example, several known structural materials, including austenitic stainless steels 304 or 316, XM-19, zirconium alloys, nickel alloys, Alloy 600, etc. may be chosen for any element of components of example system 100. Joining structures and directly-touching elements may be chosen of different and compatible materials to prevent fouling.

Given the variety of example functions described herein, example embodiment systems may be used in several methods to provide desired functionality. It will be appreciated by one skilled in the art that example embodiments may be varied through routine experimentation and without further inventive activity. For example, distinct articulators and wrists may be useable together in some examples, through device placement in examples. Variations are not to be regarded as departure from the spirit and scope of the exemplary embodiments, and all such modifications as would be obvious to one skilled in the art are intended to be included within the scope of the following claims.

What is claimed is:

1. A system for positioning a payload in a nuclear reactor, wherein the system comprises:
   an assembly including
      an extendible mast,
      a motor secured to the mast, and an articulator secured to the mast and configured to hold a tool, wherein, when the assembly is positioned extending in a vertical direction, the motor is vertically above the articulator along the mast, and wherein the motor is configured to move the articulator and at least a portion of the mast in the vertical direction; and a clamp including an arm extending transversely from a top perimeter of the nuclear reactor and joined to the mast of the assembly, wherein the clamp allows circumferential movement of the assembly along a steam dam at the top perimeter and prevents radial and vertical movement of the clamp relative to the steam dam, and wherein the arm supports the entire weight of the assembly.

2. The system of claim 1, wherein the articulator is configured to rotate the tool independently about two axes.

3. The system of claim 2, wherein the articulator includes a central axis about which the articulator can rotate itself and the tool, and wherein the articulator includes a horizontal axis perpendicular to the central axis about which the articulator can rotate itself and the tool.

4. The system of claim 2, wherein the articulator includes a center post rotatably coupled to a center gear, and wherein the articulator includes a leveling wrist rotatably coupled to the center post.

5. The system of claim 4, wherein the articulator further includes an offset plate arm rotatable with respect to a center post of the articulator.

6. The system of claim 1, wherein the mast includes a plurality of nested tubes, and wherein the motor is configured to telescope the nested tubes in the vertical direction.

7. The system of claim 6, wherein the motor includes a spool and tape attached to an end of an inner-most tube of the nested tubes to telescope the nested tubes.

8. The system of claim 1, wherein the articulator is configured to rotate the tool about at least two perpendicular axes, and wherein the assembly is configured to operate when completely submerged.

9. The system of claim 1, wherein the clamp includes at least two rollers configured to roll against opposite sides of the steam dam.

10. The system of claim 9, wherein the clamp includes a plurality of rotatable arms, each of the rotatable arms including at least two of the rollers, wherein a first roller of the two rollers is positioned at a pivot point of the rotatable arm, and wherein a second roller of the two rollers is positioned away of the pivot point so as to permit the second roller to rotate against an opposite side of the steam dam from the first roller.

11. The system of claim 10, wherein the clamp includes a frame to which the plurality of rotatable arms rotatably join each at the pivot point, and a plurality of pneumatic cylinders each connected between one of the rotatable arms and the frame.

12. The system of claim 1, wherein the articulator is configured to lock the tool in a horizontal position.

13. The system of claim 1, wherein the mast includes a plurality of telescoping tubes.

14. The system of claim 13, wherein the motor attaches via a cable to an innermost of the plurality of telescoping tubes.

15. The system of claim 13, wherein the articulator is directly attached to an innermost tube of telescoping tubes making up the mast.

16. The system of claim 15, wherein the articulator is wider than the innermost tube so as to not fit inside of the telescoping tubes.

17. The system of claim 1, wherein the clamp is the only element of the assembly configured to directly contact a fixed structure.

18. The system of claim 1, wherein the motor is locally-powered and configured for wireless communication.

19. The system of claim 1, wherein the mast includes at least three nested sections each having a quadrilateral cross-section and a stop configured to prevent any of the sections from extending entirely past the mast.

* * * * *